(12) United States Patent
Esaki (10) Patent No.: US 9,280,805 B2
(45) Date of Patent: Mar. 8, 2016

(54) IMAGE PROCESSING APPARATUS, IMAGE PROCESSING METHOD, AND MEMORY DEVICE IN WHICH IMAGE PROCESSING PROGRAM IS STORED

(71) Applicant: OLYMPUS CORPORATION, Shibuya-ku, Tokyo (JP)

(72) Inventor: Hisumi Esaki, Yokohama (JP)

(73) Assignee: OLYMPUS CORPORATION, Tokyo (JP)

(*) Notice: Subject to any disclaimer, the term of this patent is extended or adjusted under 35 U.S.C. 154(b) by 130 days.

(21) Appl. No.: 14/188,291

(22) Filed: Feb. 24, 2014

(65) Prior Publication Data

US 2014/0241645 A1    Aug. 28, 2014

(30) Foreign Application Priority Data

Feb. 27, 2013    (JP) .................. 2013-037081

(51) Int. Cl.
*G06K 9/40*    (2006.01)
*G06T 5/00*    (2006.01)

(52) U.S. Cl.
CPC ............... *G06T 5/001* (2013.01); *G06T 5/003* (2013.01); *G06T 2207/20028* (2013.01)

(58) Field of Classification Search
CPC ..... G06K 9/00; G06K 9/0063; G06K 9/3241; G06K 9/40; G06T 1/00; G06T 3/4053; G06T 5/00; G06T 5/001; G06T 5/002; G06T 5/003; G06T 5/20; G06T 7/001; G06T 7/0028; G06T 7/0042; G06T 7/0083; G06T 7/0085; G06T 7/2033; G06T 9/007; G06T 2207/10016; G06T 2207/20021; G06T 2207/20028; G06T 2207/20061; G06T 2207/20076; G06T 2207/20192; G06T 2207/330236; H04N 1/40; H04N 1/409
See application file for complete search history.

(56) References Cited

U.S. PATENT DOCUMENTS

| | | | | |
|---|---|---|---|---|
| 5,398,292 | A * | 3/1995 | Aoyama | 382/199 |
| 7,430,303 | B2 * | 9/2008 | Sefcik et al. | 382/103 |
| 7,440,635 | B2 * | 10/2008 | Tan et al. | 382/268 |
| 7,551,322 | B2 * | 6/2009 | Reese | 358/2.1 |

OTHER PUBLICATIONS

Yoshiyasu Shimizu et al., "Low Complexity Super Resolution Filter by Nonlinear Filter Using High Pass Filter and Neighborhood Sum of Square Differences", 2011 IEICE General Conference, pp. 1-4 (in English), Mar. 14, 2011.

* cited by examiner

*Primary Examiner* — Jose Couso
(74) *Attorney, Agent, or Firm* — Holtz, Holtz & Volek PC (57) ABSTRACT

Provided is an image processing apparatus including an edge identifying portion that generates an edge image in which an edge is identified at each pixel in an input image; a mask-image generating portion that distinguishes an edge direction at a pixel of interest in the input image, that calculates a difference between pixel values of pixels that are positioned perpendicular to the edge direction and that are positioned symmetrically to each other, with the pixel of interest located at a center thereof, and that generates a mask image in which a pixel value of the pixel of interest is increased as that difference decreases; an enhancement-filter image generating portion that generates an enhancement-filter image by multiplying pixel values of pixels of the edge image by pixel values of the mask image; and a combining portion that generates an output image by combining the input image and the enhancement-filter image.

7 Claims, 5 Drawing Sheets

FIG. 3

| y0 | y1 | y2 |
|----|----|----|
| y3 | y4 | y5 |
| y6 | y7 | y8 |

(A) CASE OF LOW REFERENCE DIFFERENCE VALUE (B) CASE OF HIGH REFERENCE DIFFERENCE VALUE

IMAGE PROCESSING APPARATUS, IMAGE PROCESSING METHOD, AND MEMORY DEVICE IN WHICH IMAGE PROCESSING PROGRAM IS STORED

CROSS REFERENCE TO RELATED APPLICATIONS

This application is based on Japanese Patent Application No. 2013-037081, the contents of which are incorporated herein by reference.

TECHNICAL FIELD

The present invention relates to an image processing apparatus, an image processing method, and a memory device in which an image processing program is stored for applying edge enhancement processing to an image.

BACKGROUND ART

In the recent years, there have been increases in display size and resolution, and, because there are some cases in which the resolution of an input signal is not as high as the resolution of a display screen, in order to compensate for this shortcoming, super-resolution technology that interpolates the resolution has been attracting attention.

As an example of such super-resolution technology, Non Patent Literature 1 proposes a method in which, by multiplying a value obtained by applying a high-pass filter (HPF) to an input image signal by a sum of squared differences (SSD) between a pixel of interest and surrounding pixels in the input image signal and by adding the value obtained by this multiplication to the input image signal, in an image that is enlarged by means of bicubic interpolation, the Lanczos algorithm, or the like, a high-frequency component exceeding the Nyquist frequency of the input image signal is generated.

CITATION LIST

Non Patent Literature

{NPL 1} SHIMIZU, Yoshiyasu and IKENAGA, Takeshi (Waseda University, School of Fundamental Science and Engineering, Department of Electronic and Photonic Systems), "Low complexity super resolution filter by nonlinear filter using high pass filter and neighborhood sum of square differences", The Institute of Electronics, Information, and Communication Engineers General Conference 2011, D-11-97

SUMMARY OF INVENTION

Solution to Problem

A first aspect of the present invention is an image processing apparatus including an edge identifying portion that generates an edge image in which an edge is identified at each pixel in an input image; a mask-image generating portion that distinguishes an edge direction at a pixel of interest in the input image, that calculates a difference between pixel values of pixels that are positioned perpendicular to the edge direction and that are positioned symmetrically to each other, with the pixel of interest located at a center thereof, and that generates a mask image in which a pixel value of the pixel of interest is increased as that difference decreases; an enhancement-filter image generating portion that generates an enhancement-filter image by multiplying pixel values of pixels of the edge image by pixel values of the mask image; and a combining portion that generates an output image by combining the input image and the enhancement-filter image.

A second aspect of the present invention is an image processing apparatus including a band-image generating portion that generates a plurality of band images having frequency bands that are different from each other by subjecting an input image to multiresolution decomposition; an edge identifying portion that generates edge images for the individual band images, where an edge is identified at each pixel in the individual band images; a mask-image generating portion that distinguishes edge directions for pixels of interest in the individual band images, that calculates differences between pixel values of pixels that are perpendicular to the edge directions and that are positioned symmetrically to each other, with the pixels of interest located at a center thereof, and that generates mask images for the individual band images in which pixel values of the pixels of interest are increased as that differences decrease; an enhancement-filter image generating portion that generates enhancement-filter images for the individual band images by multiplying pixel values of pixels of the edge images by pixel values of the mask images; a band combining portion that generates combined band images for the individual band images by combining the band images and the enhancement-filter images; an enlarged-combined-image generating portion that generates enlarged combined images for the individual band images, where the combined band images are enlarged to the same size as the input image; and a combining portion that generates an output image by combining the individual enlarged combined images.

A third aspect of the present invention is an image processing apparatus including a band-image generating portion that generates a plurality of band images having frequency bands that are different from each other by subjecting an input image to multiresolution decomposition; an edge identifying portion that generates edge images for the individual band images, where an edge is identified for each pixel in the individual band images; a mask-image generating portion that distinguishes edge directions for pixels of interest in the individual band images, that calculates differences between pixel values of pixels that are perpendicular to the edge directions and that are positioned symmetrically to each other, with the pixels of interest located at a center thereof, and that generates mask images for the individual band image in which pixel values of the pixels of interest are increased as that differences decrease; an enhancement-filter band-image generating portion that generates enhancement-filter band images for the individual band images by multiplying pixel values of pixels of the edge images by pixel values of the mask images; an enlarged enhancement-filter image generating portion that generates enlarged enhancement-filter images for the individual enhancement-filter band images, where the individual enhancement-filter band images are enlarged to the same size as the input image; a band combining portion that generates a combined band image by combining the individual enlarged enhancement-filter images; and a combining portion that generates an output image by combining the input image and the combined band image.

A fourth aspect of the present invention is an image processing method including a step of generating an edge image in which edges are identified for individual pixels in an input image; a step of distinguishing an edge direction at a pixel of interest in the input image, calculating a difference between pixel values of pixels that are positioned perpendicular to the edge direction and that are positioned symmetrically to each other, with the pixel of interest located at a center thereof, and generating a mask image in which a pixel value of the pixel of interest is increased as that difference decreases; a step of generating an enhancement-filter image by multiplying pixel values of pixels of the edge image by pixel values of the mask image; and a step of generating an output image by combining the input image and the enhancement-filter image.

A fifth aspect of the present invention is a memory device in which an image processing program is stored, the image processing program being adapted to cause a computer to execute a step of generating an edge image in which an edge is identified at each pixel in an input image; a step of distinguishing an edge direction at a pixel of interest in the input image, calculating a difference between pixel values of pixels that are positioned perpendicular to the edge direction and that are positioned symmetrically to each other, with the pixel of interest located at a center thereof, and generating a mask image in which a pixel value of the pixel of interest is increased as that difference decreases; a step of generating an enhancement-filter image by multiplying pixel values of pixels of the edge image by pixel values of the mask image; and a step of generating an output image by combining the input image and the enhancement-filter image.

DESCRIPTION OF EMBODIMENT

An image processing apparatus 1 according to an embodiment of the present invention will be described below with reference to the drawings.

Figure 1:
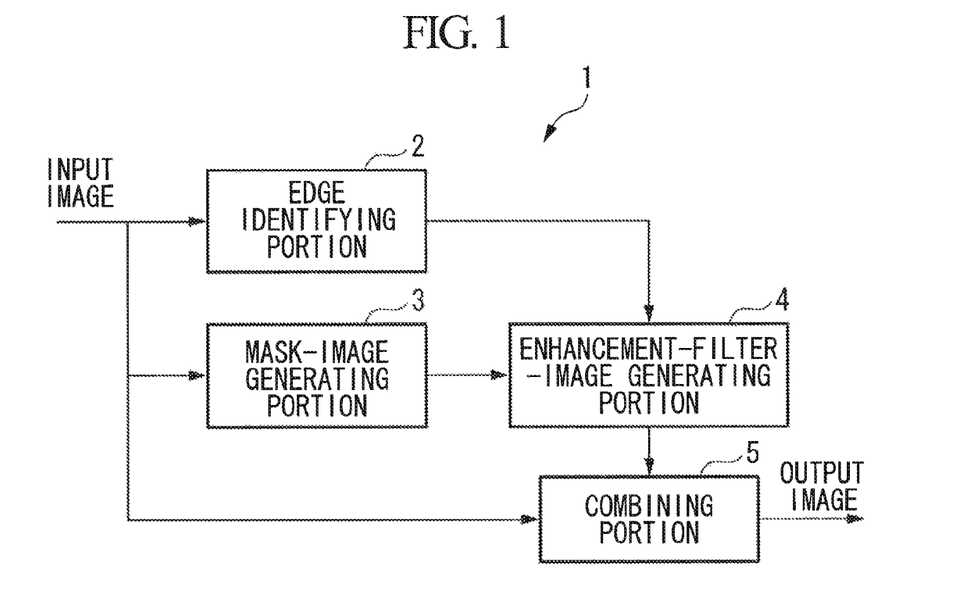
FIG. 1 is a schematic block diagram showing the configuration of an image processing apparatus according to an embodiment of the present invention.

As shown in FIG. 1, the image processing apparatus 1 is provided with an edge identifying portion 2 that generates an edge image from an input image; a mask-image generating portion 3 that generates a mask image for the input image; an enhancement-filter-image generating portion 4 that generates an enhancement-filter image from the edge image and the mask image; and a combining portion 5 that generates an output image from the input image and the enhancement-filter image.

The edge identifying portion 2 generates an edge image in which an edge is identified at each pixel in the input image by applying to the input image a high-pass filter appropriate for the input image, such as a 5×5 pixel high-pass filter, a 7×7 pixel high-pass filter, and so forth.

The mask-image generating portion 3 distinguishes the edge direction at a pixel of interest in the input image, calculates a difference between pixel values of pixels that are positioned perpendicular to the edge direction and that are positioned symmetrically to each other, with the pixel of interest located at the center, and generates a mask image in which a pixel value of the above-described pixel of interest is increased as that difference decreases.

Figure 2:
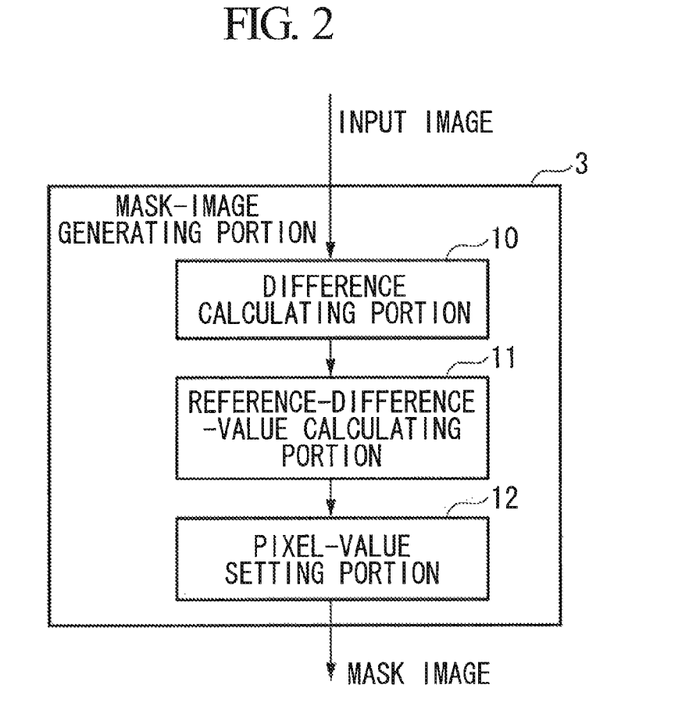
FIG. 2 is a schematic block diagram showing the configuration of a mask-image generating portion for the image processing apparatus according to the embodiment of the present invention.

For this purpose, as shown in FIG. 2, the mask-image generating portion 3 is provided with a difference calculating portion 10, a reference-difference-value calculating portion 11, and a pixel-value setting portion 12.

The difference calculating portion 10 individually calculates differences between a pixel of interest in the input image and individual surrounding pixels in a predetermined region centered around the pixel of interest. Subsequently, at the mask-image generating portion, respective processing can be applied to the input image, for example, for each 3×3 pixel region centered on a pixel of interest such as the region shown in FIG. 3.

The reference-difference-value calculating portion 11 calculates a reference difference value defined as a difference between a first pixel value, which is a pixel value of a surrounding pixel indicating a maximum value among the difference values, and a second pixel value, which is a pixel value of a surrounding pixel that is positioned symmetrically to the surrounding pixel indicating the maximum value, with the pixel of interest located at the center.

The pixel-value setting portion 12 sets a pixel value so that the pixel value of the pixel of interest in the mask image is increased as the reference difference value decreases. For example, in accordance with a graph shown in FIG. 4, the pixel-value setting portion 12 sets a combining ratio of the maximum value and the difference value between the pixel of interest and the second pixel value based on the reference difference value so that the proportion of the maximum value is increased as the reference difference value decreases, and sets the pixel value of the pixel of interest in the mask image by combining the maximum value and the difference value based on this combining ratio. At this time, if the reference difference value is less than a predetermined threshold, the maximum value can be used as the pixel value of the pixel of interest.

Figure 5:
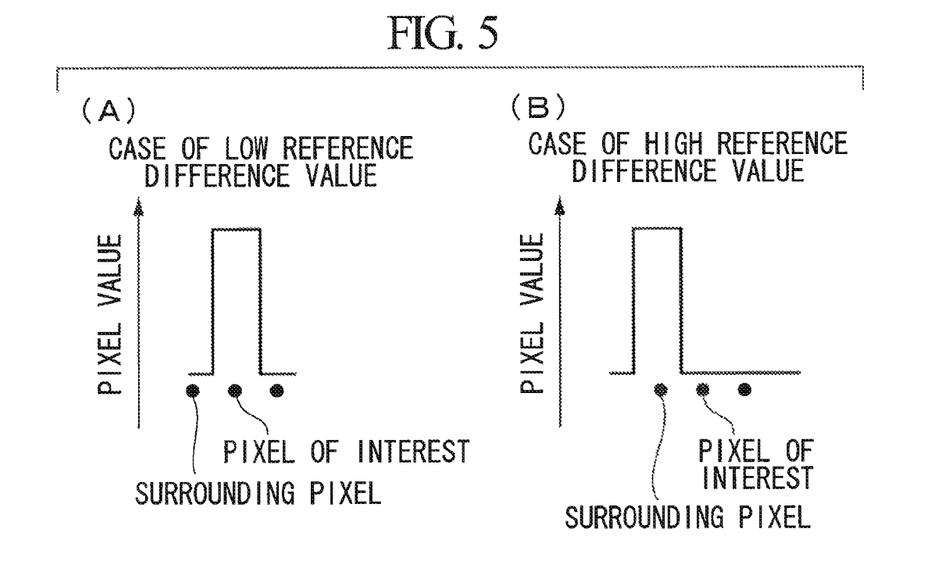
FIG. 5 is a diagram showing examples of reference difference values.

The combining ratio of the maximum value and the difference value between the pixel of interest and the second pixel value is set in this way for the following reasons. Specifically, as shown in FIG. 5, because a low reference difference value indicates that the pixel of interest is on an edge, the pixel value of the pixel of interest in the mask image is increased to enhance the pixel of interest, i.e., the edge, and, in contrast, because a high reference difference value indicates that the pixel of interest is not on the edge or on an edge where pixel values on both sides of the edge do not change in a contrasting manner, the pixel value of the pixel of interest in the mask image is decreased so as not to enhance the pixel of interest, i.e., the edge.

The enhancement-filter-image generating portion 4 generates an enhancement-filter image by multiplying pixel values of pixels of the edge image by pixel values of the mask image. Note that, by applying a gain as needed at this time, for example, the degree to which the edge is enhanced can be set.

The combining portion 5 generates an output image by combining the enhancement-filter image and the input image.

Figure 6:
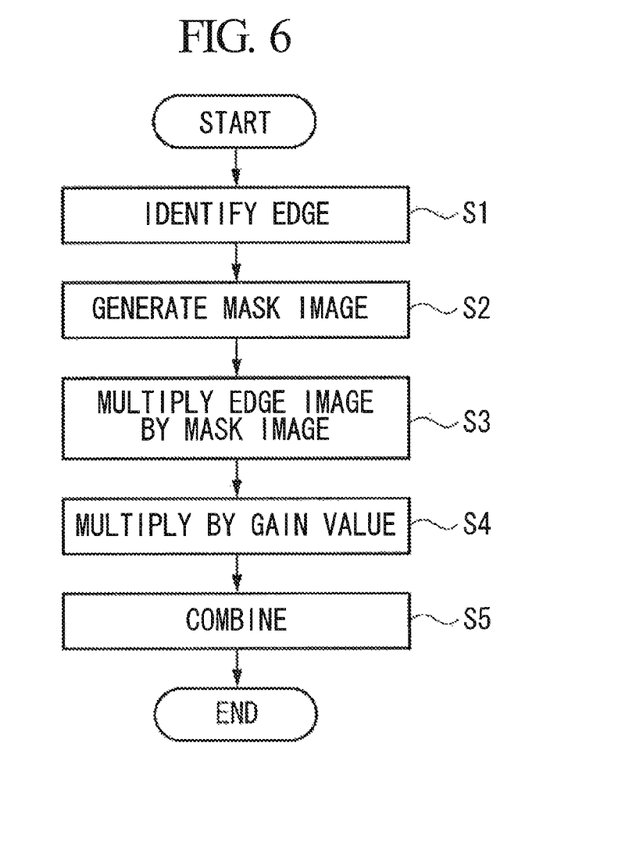
FIG. 6 is a flowchart showing the operation of the image processing apparatus according to the embodiment of the present invention.

Next, the operation of the thus-configured image processing apparatus 1 will be described in accordance with a flowchart shown in FIG. 6. Note that, in the mask-image generating portion 3 in the following description, it is assumed that respective processing is applied to the input image for each 3×3 pixel region centered on pixels of interest such as the region shown in FIG. 3.

To apply edge enhancement processing to an input image by using the image processing apparatus 1 according to this embodiment, in Step S1, an edge image in which edges are identified is generated by the edge identifying portion 2 by applying a 5×5-pixel high-pass filter to the input image.

Figure 3:
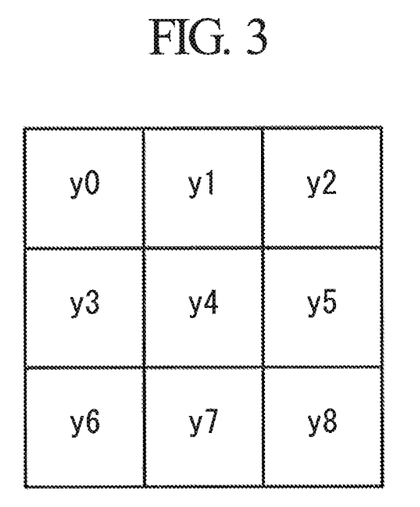
FIG. 3 is a conceptual diagram showing an example of a filter that is set by the image processing apparatus according to the embodiment of the present invention to distinguish an edge at a pixel of interest.

Next, in Step S2, a mask image is generated by the mask-image generating portion 3. Specifically, a pixel of interest to be processed is specified, and, in a 3×3 pixel region shown in FIG. 3, difference values e0, e1, e2, e3, e4, e5, e6, and e7 between a pixel of interest y4 and surrounding pixels y0, y1, y3, y5, y6, y7, and y8 of the pixel of interest y4 are individually calculated by the difference calculating portion 10 (see Expressions below).

$$e0 = |y0 - y4|$$
$$e1 = |y1 - y4|$$
$$e2 = |y2 - y4|$$
$$e3 = |y3 - y4|$$
$$e4 = |y5 - y4|$$
$$e5 = |y6 - y4|$$
$$e6 = |y7 - y4|$$
$$e7 = |y8 - y4|$$

Next, a surrounding pixel that has a maximum value among the difference values e0, e1, e2, e3, e4, e5, e6, and e7, and a surrounding pixel that is positioned symmetrically to that surrounding pixel for which the difference value indicates the maximum value, with the pixel of interest y4 located at the center, are identified by the reference-difference-value calculating portion 11. Here, in the case in which the difference value e3 is the maximum value, the surrounding pixel y3 that indicates e3 is the first pixel value, and, because the surrounding pixel that is positioned symmetrically to the surrounding pixel y3, with the pixel of interest y4 located at the center, is the surrounding pixel y5, the second pixel value is y5. Therefore, a reference difference value E is a difference value between the surrounding pixel y5 and the surrounding pixel y3.

$$E = |y3 - y5| = |e3 - e4|$$

Once the reference difference value E is calculated, the pixel value of the pixel of interest in the mask image is set by the pixel-value setting portion 12 based on this value. Specifically, a combining ratio between e3, which is the maximum value among the difference values, and the difference value e4 between the pixel of interest and the surrounding pixel y5 positioned symmetrically to the surrounding pixel y3 indicating e3 is set in accordance with the reference difference value E.

Figure 4:
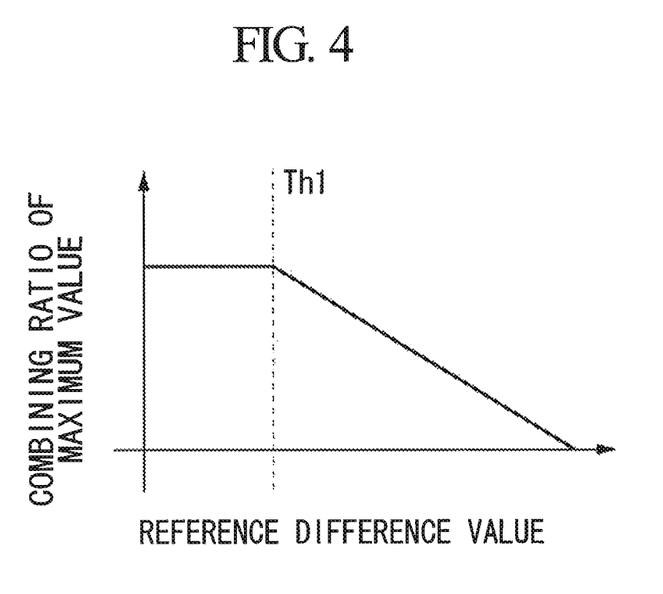
FIG. 4 is an explanatory graph illustrating the method in which the pixel-value setting portion shown in FIG. 2 sets a combining ratio of a maximum value and a difference value between the pixel of interest and a second pixel value on the basis of a reference difference value.

Regarding the combining ratio, the combining ratio of e3 and e4 is set, for example, in accordance with the graph shown in FIG. 4, so that a proportion of the maximum value e3 is increased as a the reference difference value E decreases when the reference difference value E is greater than a threshold Th1, and the result of combining e3 and e4 in accordance with the set combining ratio is used as the pixel value of the pixel of interest in question in the mask image. When the reference difference value E is less than the threshold Th1, the maximum value e3 is uniformly used as the pixel value of the pixels of interest in the mask image. Note that, although only one threshold Th1 is used in this case, it is also possible to employ a configuration in which the combining ratio is set by using a plurality of thresholds or by not using any threshold, depending on the input image and the enhancement processing. A mask image is generated when the above-described processing is completed for all pixels in the input image and pixel values of all pixels in the mask image are set.

Next, in Step S3, pixel values of pixels of the edge image is multiplied by pixel values of the mask image by the enhancement-filter-image generating portion 4, and, in Step S4, an enhancement-filter image is generated by additionally multiplying the product of the edge image and the mask image by a predetermined gain value. In Step S5, the generated enhancement-filter image and the input image are combined. Note that, at this time, the enhancement-filter image can be added to the input image after multiplying the input image by a predetermined weighting factor.

As has been described above, with the image processing apparatus 1 according to this embodiment, by specifying a surrounding pixel that indicates the maximum value among the difference values and a surrounding pixel that is symmetrically positioned to this surrounding pixel, it is possible to estimate a direction perpendicular to the edge direction, and, by calculating the reference difference value, it is possible to judge, based on the magnitude of the reference difference value, whether or not the pixel of interest is on an edge or whether or not the pixel of interest is in the immediate vicinity of an edge.

Then, because a mask image is generated in accordance with the result of this judgment, that is to say, the pixel values of the mask image are increased when the pixels of interest are on an edge and the pixel values thereof are decreased when the pixels of interest are not on an edge, even by one pixel, the region to which edge enhancement is applied can be limited to positions very close to the edge. Then, because the pixels to be subjected to the edge enhancement processing and the strength of the enhancement processing are for the input image determined based on the enhancement-filter image generated by multiplying pixel values of pixels of the edge image by pixel values of the mask image, in the output image in which the input image and the enhancement-filter image are combined, more-natural edge enhancement can be achieved while suppressing the occurrence of ringing.

(Modification 1)

Although the configuration employed in the above-described embodiment is such that the edge identification, the mask-image generation, and the enhancement-filter image generation are performed without modifying the input image, there is no limitation thereto, and, for example, it is also possible to employ a configuration in which a plurality of band images having different frequency bands from each other are obtained by applying multiresolution decomposition to the input image, and the edge identification, the mask-image generation, and the enhancement-filter image generation are performed for the individual band images.

Figure 7:
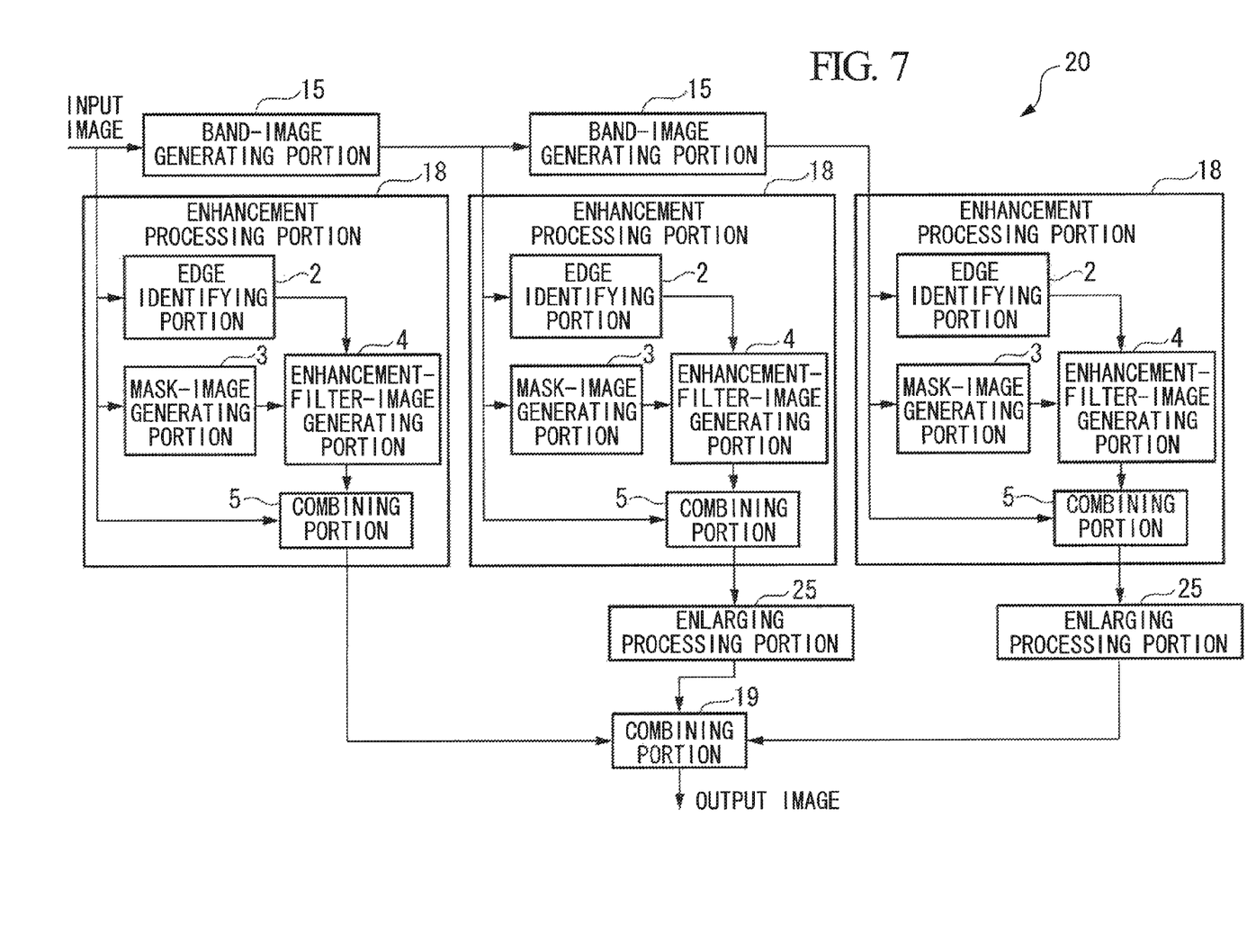
FIG. 7 is a schematic block diagram showing the configuration of an image processing apparatus according to a modification of the embodiment of the present invention.

As shown in FIG. 7, an image processing apparatus 20 is provided with band-image generating portions 15 that generate a plurality of band images having different frequency bands from each other by performing multiresolution decomposition, enhancement processing portions 18 in a number corresponding to the number of the band images to be generated, and combining portions 19 that perform image combining to generate combined band images which are output images for the band images output from the individual enhancement processing portions 18.

As with the image processing apparatus 1 described above, each enhancement processing portion 18 is provided with, the edge identifying portion 2, the mask-image generating portion 3, the enhancement-filter-image generating portion 4, and the combining portion 5. The individual band images are input to the enhancement processing portions 18, and the combined band images, which are the output images, are generated for the individual band images and are output therefrom. Because the processing performed at the individual enhancement processing portions 18 is same as the processing at the image processing apparatus 1 described above, descriptions thereof will be omitted.

The plurality of combined band images output from the individual enhancement processing portions 18 are subjected to enlarging processing by enlarging processing portions 25, to which low-pass filters or the like are applied as needed; are subsequently input to a combining portion 19; and are combined at the combining portion 19, thus generating an output image.

By performing the edge identification, the mask-image generation, and the enhancement-filter-image generation for the individual band images obtained by subjecting the input image to multiresolution decomposition in this way, more-natural edge enhancement can be achieved while suppressing the occurrence of ringing with even less dependence on the thickness of an edge line as compared with the image processing apparatus 1 described above.

(Modification 2)

In addition, although the enhancement processing is performed for the individual band images, the combined band images are individually generated, and the output image is subsequently generated in the above-described modification 1, with this modification 2, enhancement-filter band images for the individual band images are generated without generating combined band images for the individual band images, and one combined band image is generated based on the enhancement-filter band images. Furthermore, the combined band image and the input image are combined to generate an output image.

Figure 8:
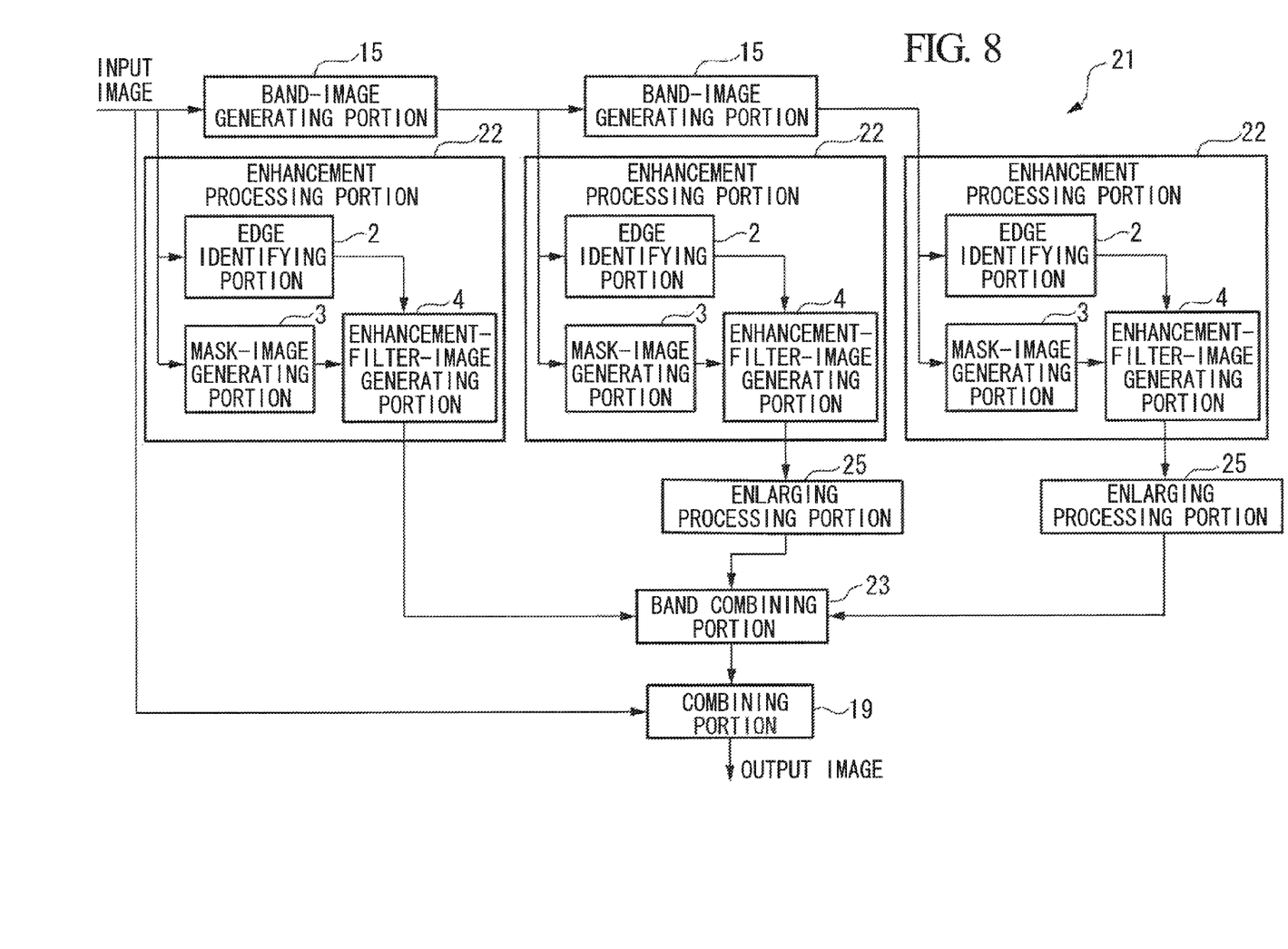
FIG. 8 is a schematic block diagram showing the configuration of an image processing apparatus according to a modification of the embodiment of the present invention.

As shown in FIG. 8, an image processing apparatus 21 is provided with the band-image generating portions 15 that generate a plurality of band images having different frequency bands from each other by performing multiresolution decomposition, enhancement processing portions 22 in a number corresponding to the number of band images to be generated, a band combining portion 23 that combines the band images output from the individual enhancement processing portions 22 into one combined band image, and the combining portion 19 that combines the combined band image and the input image.

Each enhancement processing portion 22 is provided with the edge identifying portion 2, the mask-image generating portion 3, and the enhancement-filter-image generating portion 4. The individual band images are input to the enhancement processing portions 22, and enhancement-filter band images are generated and output for the individual band images. Because the processing performed at the edge identifying portions 2, the mask-image generating portions 3, and the enhancement-filter-image generating portions 4 of the individual enhancement processing portions 22 is same as the processing performed in the image processing apparatus 1 described above, descriptions thereof will be omitted.

The enhancement-filter band images for different bands output from the enhancement-filter-image generating portions 4 are subjected to the enlarging processing by enlarging processing portions 25, to which low-pass filters or the like are applied as needed; are subsequently input to the band combining portion 23; and are combined at the band combining portion 23 to generate one combined band image. The combined band image is combined with the input image at the combining portion 19, thus generating an output image.

By performing the edge identification, the mask-image generation, and the enhancement-filter-image generation for the individual band images obtained by subjecting the input image to multiresolution decomposition in this way, more-natural edge enhancement can be achieved while suppressing the occurrence of ringing, with even less dependence on the thickness of an edge line as compared with the image processing apparatus 1 described above.

The following aspects of the invention are derived from the above embodiments.

A first aspect of the present invention is an image processing apparatus including an edge identifying portion that generates an edge image in which an edge is identified at each pixel in an input image; a mask-image generating portion that distinguishes an edge direction at a pixel of interest in the input image, that calculates a difference between pixel values of pixels that are positioned perpendicular to the edge direction and that are positioned symmetrically to each other, with the pixel of interest located at a center thereof, and that generates a mask image in which a pixel value of the pixel of interest is increased as that difference decreases; an enhancement-filter image generating portion that generates an enhancement-filter image by multiplying pixel values of pixels of the edge image by pixel values of the mask image; and a combining portion that generates an output image by combining the input image and the enhancement-filter image.

With the first aspect, an edge image in which edges are identified for individual pixels in an input image is generated and a mask image for the input image is also generated. Here, a difference between pixel values of pixels that are positioned perpendicular to the edge direction of the pixel of interest in the input image and that are positioned symmetrically to each other, with the pixel of interest located at the center, is calculated, and an image in which a pixel value of the pixel of interest is increased as that difference decreases is generated as the mask image. The enhancement-filter image is generated by multiplying pixel values of the generated mask image by pixel values of pixels of the edge image, and the output image is generated by combining the input image and the enhancement-filter image.

In this case, by calculating the difference between the pixel values of the pixels that are positioned perpendicular to the edge direction and that are positioned symmetrically to each other, with a pixel of interest located at the center, it is possible to judge, based on the magnitude of the difference, whether or not pixels of interest are on an edge or whether or not the pixels of interest are in the immediate vicinity of an edge. Because the mask image is generated in accordance with the result of this judgment, that is to say, the pixel values of the mask image are increased when the pixels of interest are on an edge and the pixel values thereof are decreased when the pixels of interest are not on the edge even by one pixel, regions to which the edge enhancement is applied can be limited to positions very close to the edge. Thus, because the pixels to be subjected to the edge enhancement processing and the strength of the enhancement processing are determined for the input image based on the enhancement-filter image generated by multiplying pixel values of pixels of the edge image by pixel values of the mask image, in the output image in which the input image and the enhancement-filter image are combined, more-natural edge enhancement can be achieved while suppressing the occurrence of ringing.

In the above-described first aspect, it is preferable that the mask-image generating portion includes a difference calculating portion that individually calculates difference values between the pixel of interest in the input image and individual surrounding pixels contained in a predetermined region centered on the pixel of interest; a reference-difference-value calculating portion that calculates a reference difference value that is a difference value between a first pixel value, which is a pixel value of a surrounding pixel indicating a maximum value among the difference values, and a second pixel value, which is a pixel value of a surrounding pixel that is positioned symmetrically to the surrounding pixel indicating the maximum value, with the pixel of interest located at a center thereof; and a pixel-value setting portion that increases the pixel value of the pixel of interest as the reference difference value decreases.

By doing so, in the case in which the reference difference value is extremely low, because the pixel of interest is positioned on an edge where pixel values on both sides of the edge change in a contrasting manner, it is possible to increase the strength of the enhancement processing to be applied to these pixel values in the enhancement-filter image generated later by increasing the pixel value of the pixel of interest in the mask image. In contrast, in the case in which the reference difference value is high, because the pixel of interest is not on an edge or on an edge where pixel values on both sides of the edge do not change in a contrasting manner, it is possible to suppress the occurrence of ringing by decreasing the strength of the enhancement processing to be applied to these pixel values. By doing so, more-natural edge enhancement can be achieved while suppressing the occurrence of ringing in the output image in which the input image and the enhancement-filter image are combined.

In the above-described first aspect, it is preferable that the pixel-value setting portion sets the pixel value of the pixel of interest in the mask image by combining, based on the reference difference value, the maximum value and a difference value between the pixel of interest and the second pixel value so that a proportion of the maximum value is increased as the reference difference value decreases.

Because the degree of the enhancement processing can be made moderate by setting the pixel value of the mask image at the pixel of interest while changing the combining ratio of the difference value between the maximum value and the second pixel value in accordance with the value of the reference difference value in this way, it is possible to prevent unnatural edge enhancement.

In the above-described first aspect, it is preferable that the pixel-value setting portion uses the maximum value as the pixel value of the pixel of interest when the reference difference value is less than a threshold.

By doing so, greater edge enhancement can be achieved for the pixel of interest assumed to be positioned at a center portion of an edge.

A second aspect of the present invention is an image processing apparatus including a band-image generating portion that generates a plurality of band images having frequency bands that are different from each other by subjecting an input image to multiresolution decomposition; an edge identifying portion that generates edge images for the individual band images, where an edge is identified at each pixel in the individual band images; a mask-image generating portion that distinguishes edge directions for pixels of interest in the individual band images, that calculates differences between pixel values of pixels that are perpendicular to the edge directions and that are positioned symmetrically to each other, with the pixels of interest located at a center thereof, and that generates mask images for the individual band images in which pixel values of the pixels of interest are increased as that differences decrease; an enhancement-filter image generating portion that generates enhancement-filter images for the individual band images by multiplying pixel values of pixels of the edge images by pixel values of the mask images; a band combining portion that generates combined band images for the individual band images by combining the band images and the enhancement-filter images; an enlarged-combined-image generating portion that generates enlarged combined images for the individual band images, where the combined band images are enlarged to the same size as the input image; and a combining portion that generates an output image by combining the individual enlarged combined images.

By performing the edge identification, the mask-image generation, and the enhancement-filter-image generation for the individual band images obtained by subjecting the input image to multiresolution decomposition in this way, more-natural edge enhancement can be achieved while suppressing the occurrence of ringing, with no dependence on the thickness of an edge line.

A third aspect of the present invention is an image processing apparatus including a band-image generating portion that generates a plurality of band images having frequency bands that are different from each other by subjecting an input image to multiresolution decomposition; an edge identifying portion that generates edge images for the individual band images, where an edge is identified for each pixel in the individual band images; a mask-image generating portion that distinguishes edge directions for pixels of interest in the individual band images, that calculates differences between pixel values of pixels that are perpendicular to the edge directions and that are positioned symmetrically to each other, with the pixels of interest located at a center thereof, and that generates mask images for the individual band image in which pixel values of the pixels of interest are increased as that differences decrease; an enhancement-filter band-image generating portion that generates enhancement-filter band images for the individual band images by multiplying pixel values of pixels of the edge images by pixel values of the mask images; an enlarged enhancement-filter image generating portion that generates enlarged enhancement-filter images for the individual enhancement-filter band images, where the individual enhancement-filter band images are enlarged to the same size as the input image; a band combining portion that generates a combined band image by combining the individual enlarged enhancement-filter images; and a combining portion that generates an output image by combining the input image and the combined band image.

By performing the edge identification, the mask-image generation, and the enhancement-filter-image generation for the individual band images obtained by subjecting the input image to multiresolution decomposition in this way, more-natural edge enhancement can be achieved while suppressing the occurrence of ringing with, no dependence on the thickness of an edge line.

A fourth aspect of the present invention is an image processing method including a step of generating an edge image in which edges are identified for individual pixels in an input image; a step of distinguishing an edge direction at a pixel of interest in the input image, calculating a difference between pixel values of pixels that are positioned perpendicular to the edge direction and that are positioned symmetrically to each other, with the pixel of interest located at a center thereof, and generating a mask image in which a pixel value of the pixel of interest is increased as that difference decreases; a step of generating an enhancement-filter image by multiplying pixel values of pixels of the edge image by pixel values of the mask image; and a step of generating an output image by combining the input image and the enhancement-filter image.

A fifth aspect of the present invention is a memory device in which an image processing program is stored, the image processing program being adapted to cause a computer to execute a step of generating an edge image in which an edge is identified at each pixel in an input image; a step of distinguishing an edge direction at a pixel of interest in the input image, calculating a difference between pixel values of pixels that are positioned perpendicular to the edge direction and that are positioned symmetrically to each other, with the pixel of interest located at a center thereof, and generating a mask image in which a pixel value of the pixel of interest is increased as that difference decreases; a step of generating an enhancement-filter image by multiplying pixel values of pixels of the edge image by pixel values of the mask image; and a step of generating an output image by combining the input image and the enhancement-filter image.

REFERENCE SIGNS LIST 1 image processing apparatus
2 edge identifying portion
3 mask-image generating portion
4 enhancement-filter-image generating portion
5 combining portion
10 difference calculating portion
11 reference-difference-value calculating portion
12 pixel-value setting portion

The invention claimed is:

1. An image processing apparatus comprising:
an edge identifying portion that generates an edge image in which an edge is identified at each pixel in an input image;
a mask-image generating portion that: (i) distinguishes an edge direction at a pixel of interest in the input image, (ii) calculates a difference between pixel values of pixels that are positioned perpendicular to the edge direction and that are positioned symmetrically to each other, with the pixel of interest located at a center thereof, and (iii) generates a mask image in which a pixel value of the pixel of interest is increased as said difference decreases;
an enhancement-filter image generating portion that generates an enhancement-filter image by multiplying pixel values of pixels of the edge image by pixel values of the mask image; and
a combining portion that generates an output image by combining the input image and the enhancement-filter image;
wherein the mask-image generating portion includes:
a difference calculating portion that individually calculates difference values between the pixel of interest in the input image and individual surrounding pixels contained in a predetermined region centered on the pixel of interest;
a reference-difference-value calculating portion that calculates a reference difference value that is a difference value between a first pixel value, which is a pixel value of a surrounding pixel indicating a maximum value among the difference values, and a second pixel value, which is a pixel value of a surrounding pixel that is positioned symmetrically to the surrounding pixel indicating the maximum value, with the pixel of interest located at a center thereof; and
a pixel-value setting portion that increases the pixel value of the pixel of interest as the reference difference value decreases.

2. The image processing apparatus according to claim 1, wherein the pixel-value setting portion sets the pixel value of the pixel of interest in the mask image by combining, based on the reference difference value, the maximum value and a difference value between the pixel of interest and the second pixel value so that a proportion of the maximum value is increased as the reference difference value decreases.

3. The image processing apparatus according to claim 1, wherein the pixel-value setting portion uses the maximum value as the pixel value of the pixel of interest when the reference difference value is less than a threshold.

4. An image processing apparatus comprising:
a band-image generating portion that generates a plurality of band images having frequency bands that are different from each other by subjecting an input image to multi-resolution decomposition;
an edge identifying portion that generates edge images for the individual band images, where an edge is identified at each pixel in the individual band images;
a mask-image generating portion that: (i) distinguishes edge directions for pixels of interest in the individual band images, (ii) calculates differences between pixel values of pixels that are perpendicular to the edge directions and that are positioned symmetrically to each other, with the pixels of interest located at a center thereof, and (iii) generates mask images for the individual band images in which pixel values of the pixels of interest are increased as said differences decrease;
an enhancement-filter image generating portion that generates enhancement-filter images for the individual band images by multiplying pixel values of pixels of the edge images by pixel values of the mask images;
a band combining portion that generates combined band images for the individual band images by combining the band images and the enhancement-filter images;
an enlarged-combined-image generating portion that generates enlarged combined images for the individual band images, where the combined band images are enlarged to the same size as the input image; and
a combining portion that generates an output image by combining the individual enlarged combined images.

5. An image processing apparatus comprising:
a band-image generating portion that generates a plurality of band images having frequency bands that are different from each other by subjecting an input image to multi-resolution decomposition;
an edge identifying portion that generates edge images for the individual band images, where an edge is identified for each pixel in the individual band images;
a mask-image generating portion that: (i) distinguishes edge directions for pixels of interest in the individual band images, (ii) calculates differences between pixel values of pixels that are perpendicular to the edge directions and that are positioned symmetrically to each other, with the pixels of interest located at a center thereof, and (iii) generates mask images for the individual band image in which pixel values of the pixels of interest are increased as said differences decrease;
an enhancement-filter band-image generating portion that generates enhancement-filter band images for the individual band images by multiplying pixel values of pixels of the edge images by pixel values of the mask images;

an enlarged enhancement-filter image generating portion that generates enlarged enhancement-filter images for the individual enhancement-filter band images, where the individual enhancement-filter band images are enlarged to the same size as the input image;

a band combining portion that generates a combined band image by combining the individual enlarged enhancement-filter images; and a combining portion that generates an output image by combining the input image and the combined band image.

6. An image processing method comprising:

generating an edge image in which edges are identified for individual pixels in an input image;

distinguishing an edge direction at a pixel of interest in the input image, calculating a difference between pixel values of pixels that are positioned perpendicular to the edge direction and that are positioned symmetrically to each other, with the pixel of interest located at a center thereof, and generating a mask image in which a pixel value of the pixel of interest is increased as said difference decreases;

generating an enhancement-filter image by multiplying pixel values of pixels of the edge image by pixel values of the mask image; and generating an output image by combining the input image and the enhancement-filter image;

wherein difference values between the pixel of interest in the input image and individual surrounding pixels contained in a predetermined region centered on the pixel of interest are individually calculated;

wherein a reference difference value is calculated that is a difference value between a first pixel value, which is a pixel value of a surrounding pixel indicating a maximum value among the difference values, and a second pixel value, which is a pixel value of a surrounding pixel that is positioned symmetrically to the surrounding pixel indicating the maximum value, with the pixel of interest located at a center thereof; and wherein the pixel value of the pixel of interest is increased as the reference difference value decreases.

7. A memory device having stored thereon an image processing program for controlling a computer of an image processing apparatus to execute functions comprising:

generating an edge image in which an edge is identified at each pixel in an input image;

distinguishing an edge direction at a pixel of interest in the input image, calculating a difference between pixel values of pixels that are positioned perpendicular to the edge direction and that are positioned symmetrically to each other, with the pixel of interest located at a center thereof, and generating a mask image in which a pixel value of the pixel of interest is increased as said difference decreases;

generating an enhancement-filter image by multiplying pixel values of pixels of the edge image by pixel values of the mask image; and generating an output image by combining the input image and the enhancement-filter image;

wherein difference values between the pixel of interest in the input image and individual surrounding pixels contained in a predetermined region centered on the pixel of interest are individually calculated;

wherein a reference difference value is calculated that is a difference value between a first pixel value, which is a pixel value of a surrounding pixel indicating a maximum value among the difference values, and a second pixel value, which is a pixel value of a surrounding pixel that is positioned symmetrically to the surrounding pixel indicating the maximum value, with the pixel of interest located at a center thereof; and wherein the pixel value of the pixel of interest is increased as the reference difference value decreases.

* * * * *